United States Patent [19]
Wilfinger et al.

[11] Patent Number: 5,545,841
[45] Date of Patent: Aug. 13, 1996

[54] ACCLIMATIZED EXPERIMENT CONTAINER FOR CONTROLLED BIOCHEMICAL AND BIOLOGICAL INVESTIGATIONS

[75] Inventors: William W. Wilfinger, St. Bernard, Ohio; Bruce Kendall, State College, Pa.

[73] Assignee: The Penn State Research Foundation, University Park, Pa.

[21] Appl. No.: 314,024

[22] Filed: Sep. 28, 1994

[51] Int. Cl.$^6$ ..................................................... H05K 5/06
[52] U.S. Cl. .................. 174/17.08; 174/50; 174/52.3; 220/421; 220/426; 361/691
[58] Field of Search ..................... 174/50, 50.5, 52.1, 174/17 CT, 17.08; 220/420, 422, 426; 361/600, 605, 622, 641, 643, 679, 728, 691; 439/271, 276; 376/294; 277/3, 27

[56] References Cited

U.S. PATENT DOCUMENTS

| | | | |
|---|---|---|---|
| 3,573,343 | 4/1971 | De Smidt | 174/52 |
| 3,731,585 | 5/1973 | Demberg et al. | 86/1 |
| 4,364,208 | 12/1982 | Wilson | 52/82 |
| 4,406,458 | 9/1983 | Maier | 277/3 |
| 4,795,173 | 1/1989 | Osborne | 277/168 |
| 4,821,914 | 4/1989 | Owen et al. | 220/421 |
| 4,848,806 | 7/1989 | Miller | 285/106 |
| 4,871,087 | 10/1989 | Johnson | 222/1 |
| 4,993,720 | 2/1991 | Ciotola | 277/27 |
| 4,997,034 | 3/1991 | Steffen et al. | 165/104.34 |
| 5,050,821 | 9/1991 | Kerstein et al. | 244/158 R |
| 5,096,087 | 3/1992 | Thomas | 220/561 |
| 5,156,329 | 10/1992 | Farrell | 229/125.35 |
| 5,247,424 | 9/1993 | Harris et al. | 361/704 |
| 5,303,836 | 4/1994 | Childress | 220/1.5 |
| 5,335,809 | 8/1994 | Toida et al. | 220/425 |

*Primary Examiner*—Kristine L. Kincaid
*Assistant Examiner*—Michael J. Cornelison
*Attorney, Agent, or Firm*—Thomas J. Monahan

[57] ABSTRACT

A seamless, light weight container that provides two levels of liquid and gaseous containment. The container has removable covers that have a double seal which allows confirmation of seal integrity prior to shipment by applying a vacuum or pressure to the internal space between the inner and outer seals. This close-out vacuum or pressure test can be completed within minutes and it provides certification that the container seals meet design criteria for quick turnaround in spacecraft environments.

8 Claims, 4 Drawing Sheets

ACCLIMATIZED EXPERIMENT CONTAINER FOR CONTROLLED BIOCHEMICAL AND BIOLOGICAL INVESTIGATIONS

BACKGROUND OF THE INVENTION

The present invention relates to the field of microgravity life science investigation. More specifically, it relates to a novel container that has been specifically designed to provide a controlled experimental environment, suitable for the containment, transportation, and performance of critical scientific investigations with labile biochemical and biological samples aboard spacecraft such as the Space Shuttle.

Attention is called to U.S. Pat. Nos.: 3,810,367; 3,968,895; 4,502,295; 4,573,581; 4,695,536; 4,747,298; 4,795,173; 4,802,600; 4,821,914; 4,848,806; 4,911,317; 4,951,482; 4,997,034; 5,050,821; 5,156,329; 5,285,657; and 5,303,836.

Increasing numbers of highly toxic chemicals and infectious biological samples are being used in scientific investigations aboard spacecraft especially the Space Shuttle. In order to provide a suitable experimental environment and address important Space Transportation System (STS) safety issues, the containers that are used to house and transport these samples must address four important considerations. First and foremost, they must provide a controlled experimental environment that will sustain labile samples. Secondly, they must provide reliable management of liquids and gases in applications where environmental control and containment are equally important. Thirdly, the containers must be sufficiently versatile to accommodate an assortment of different experimental applications. Finally, the container design must be user friendly. It must provide the shipper with the ability to rapidly package sensitive or hazardous materials and quickly test the container for its integrity. The container design must also be quickly recoverable after it arrives at its destination. Currently, no container provides all these design features for controlled microgravity life science investigations.

Experiment Control

An important consideration in the design of any experiment is to apply a treatment under a set of controlled experimental conditions. Although this objective is easily achieved in the research laboratory, precisely controlled environmental conditions are much more difficult to maintain during shipment or during the performance of an experiment in space. Experimental variables such as temperature, pressure, humidity, atmospheric composition, etc. constantly change aboard spacecraft such as the Shuttle. Therefore, the integrity of the biological samples and the interpretation of experimental results can be significantly compromised when multiple environmental factors simultaneously change.

1. Temperature Control: Biochemical and physiological processes are dramatically influenced by temperature. In order to accommodate a wide range of biological samples, it is desirable to control temperatures within the range of 4° to 40° C. Temperatures of 20° to 40° C. are essential for biochemical and biological studies while temperatures below 10° C. are required to stabilize and preserve labile samples until they can be returned to the laboratory. In addition to flexible temperature control, container design considerations must provide efficient thermal transfer into or away from the experiment with minimal thermal gradients.

2. Pressure Control: Atmospheric pressure at sea level is approximately 14.7 psi. This ambient pressure plays an important role in regulating the concentrations of dissolved gases in aqueous solutions. During space walks and during shipment in unpressurized aircraft cargo compartments, significant reductions in external pressure can be experienced. The resulting change in pressure can produce significant decreases in the concentration of oxygen and carbon dioxide within biological solutions thereby affecting basal metabolism and pH control. In order to minimize the impact of pressure changes on biological samples as well as alterations in the composition of the gaseous environment within the sample container, design features must provide structural stability as well as liquid and gas containment during periods in which external pressure is changing.

3. Humidity: Living tissues require the continuous transfer of oxygen to biological samples and the diffusion of carbon dioxide away from the samples. In order to accomplish this objective while providing liquid containment, gas permeable membranes are utilized. Due to the permeable nature of these materials, significant quantities of fluid can be continuously lost due to evaporation. To maintain the tonicity of the biological solutions, the net flux of fluid across these membranes must be zero. In order to accomplish this objective, a saturated water atmosphere must be maintained within the experiment container in order to preserve the integrity of the biological solutions.

4. Gaseous Environment: In a sealed container, the composition of the gases needs to be controlled to meet the specific requirements of an experiment. For example, a higher concentration of oxygen could be employed to provide better aeration of biological samples. In addition, one or more gases may need to be removed from the container to provide a completely defined and unique experimental environment for the samples. Conversely, biological samples would also need to be protected from toxic reagents that might be used to sterilize and sanitize the external surface of the container prior to shipment.

Containment

The maintenance of a defined experimental environment is significantly complicated by the need to seal the samples so that toxic or infectious materials will not escape into the external environment. In order to obtain shipping or launch approval, the experimenter must be able to demonstrate that all samples are securely sealed within several levels of redundant containment. Specifically, if contents escape from the primary "sample container", additional barriers must be present to prevent it from gaining access to the external environment. Each "sample container" is considered to provide an initial level of containment. Two additional levels of containment must be provided to meet STS safety requirements during flights aboard the Orbiter. The experimenter must also demonstrate that individual container seals do not exceed a leak detection limit of $10^{-4}$ standard CC of helium/sec.

Ability to Accommodate a Variety of Experimental Packages

In order to provide maximum flexibility for the user, the container design features should be able to accommodate a variety of different applications. Specifically, internal structural elements should provide adequate strength and support to securely attach the experiment or samples to the container during shipment but retain sufficient adaptability to accommodate a variety of different configurations. This versatility provides the user with the flexibility to maintain a defined internal environment without the need to build new experiment containers each time the experiment package is altered to accommodate a new requirement.

Provide Late Access and Early Retrieval Capabilities

Microgravity studies routinely utilize biological materials that have a limited shelf-life. The labile nature of biological samples necessitates loading the experiment onto the launch vehicle as close to the time of launch as possible. Providing "late access" for biological samples, a controlled environment for the experiment and adequate assurance that the experiment package is well sealed is a formidable task. Previously, no single container has been designed to provide temperature regulation, chemical containment, pressure control, humidity control, and the ability to provide a precondition gaseous environment in a user friendly experimental package that can be tested quickly for its integrity in space or ground-based applications.

A review of the prior art reveals two broad classifications of shipping containers consisting of what can be refereed to as "universal" shipping containers for air, sea or land cargo and more specialized materials shipping containers for hazardous materials, human or animal tissues, pharmaceuticals and microgravity payloads.

I. Universal Cargo Containers

The shipment of cargo internationally has resulted in the development of an assortment of design features which provide for more efficient loading and utilization of space aboard aircraft and other transportation vehicles. Features typically include moveable structural elements, light weight construction and limited protection of the contents from the elements during loading and unloading operations. In applications where expensive cargo could be damaged by moisture, salt corrosion or excessive dirt, controlled environmental storage systems have been developed. Typically, these containers are fabricated with flexible gas and water impermeable materials such as butyl rubber. The flexible covers are usually supported by a rigid tubular frame and they contain one or more entrances that are typically accessed via some type of zipper mechanism. The internal gaseous environment within these containers can also be removed or preconditioned to provide further protection for the cargo. In general, these containers are specifically designed to efficiently accommodate the bulk shipment of perishable cargo. They are not designed for or applicable to the shipment of hazardous materials or biological samples.

II. Specialized Cargo Containers

Tissue and Organ Shipping Containers

The improvement of transplantation procedures and the development of immune system modulatory drugs has dramatically improved the viability of tissue and organ transplants. The success of these medical procedures has increased the demand for transplantation tissues and resulted in the approval of numerous patents for devices that preserve and maintain these tissues during shipment. The initial art simply consisted of insulated, sterile containers in which transplantation organs were maintained for relatively short periods of time under hypothermic conditions. However, more recent art has focused on the development of highly sophisticated computer-controlled shipping containers in which critical factors such as temperature and tissue perfusion are closely controlled and monitored. Although these improvements have significantly enhanced the art, as it relates to the shipment of intact organs and tissues, these devices are unsuitable for microgravity applications where gas and liquid containment and more strenuous environment control are of critical importance.

Environmentally Controlled Medication Containers

An assortment of insulated devices has also been developed for the short term transportation of labile pharmaceutics. These containers are relatively inexpensive and they simply provide patients with a mechanism for protecting pharmaceutical preparations or chemicals from rapid degradation by ambient conditions of temperature and environment.

Hazardous Materials Containers

An array of containers has been developed for the shipment of specialized hazardous materials such as corrosives, explosives, volatile and flammable materials, radioactive samples, etc. These devices are designed to specifically contain and or stabilize a hazardous material so that it can be shipped safely via standard air, land or sea vehicles. The highly specialized nature of these containers makes them unsuitable and inappropriate for the broad based applications that are required for microgravity life science experimentation.

Microgravity Payload Containers

A number of payload containers have been developed for microgravity applications. These devices are structurally mounted to either the cargo bay of the Orbiter or rack mounted in the interior of the Shuttle. Typically, the experiment package is operated independently via an onboard computer or through an electrical, thermal or other suitable interface provided by the launch vehicle These containers generally provide structural integrity for the payload and some form of sample containment. The stringent STS containment requirements that are required to achieve flight approval have complicated the development of user-friendly containers that are suitable for late access biological experimentation. Previously developed art requires integration into the vehicle weeks or months prior to launch thereby making these devices entirely unsuitable for microgravity life science applications.

The present invention overcomes the prior art with its unique features by reducing the time needed and easing the way biological samples can be loaded into the container, reassembled and subsequently tested to certify STS compliance. These features are made possible by the utilization of a redundant sealing mechanism on all surfaces that provide access into or an exit path from the container. Although designs employing redundant seals have been used in such diverse applications as the seal assembly between joining rocket booster motors and in hydraulic brake system applications, this approach has not been previously utilized in applications involving the sealing and testing of containers for microgravity life science applications.

The seal design of the present invention enables the investigator to perform the final late access test procedure that is required to certify the sealing integrity of the payload.

This test is accomplished by the application and maintenance of either a vacuum or pressure to the limited area occupied between the adjacent seals that circumscribe all container openings. The successful completion of the close-out test not only certifies the integrity of the containment system but it provides a noninvasive mechanism for preserving the user-defined experimental environment inside the container. Evaluating the sealing integrity of the continuous channel network, between all of the sealed surfaces that enter or exit the container, enables the user to achieve environmental and experimental control capabilities that have been previously unachievable. It should be noted that sealing mechanism is an integral component of the container and thereby uniquely different from the devices and fixtures that have been developed for the testing of seal integrity in the canning and food processing industry.

SUMMARY OF THE INVENTION

A sealed container that interfaces with a temperature control device but not necessarily limited to that device is described for the containment and transportation of infectious or hazardous biochemical or biological materials. The seamless metal container provides two levels of liquid and gas containment. Internal aspects of the container are easily accessed from different surfaces thereby providing great flexibility and optimal use of the internal space. A double seal design provides high quality containment of liquids and gas (leak rates below 1 part per 100,000 per hour) and a rapid, non-destructive and reliable test procedure to certify closure during shipment. The excellent sealing properties of the container allow the user to specifically tailor the internal environment to address the needs of an experiment (e.g. pressure, humidity, gas composition, temperature, etc.) while meeting the unique safety concerns that are required for flight certification aboard the Space Shuttle (e.g. containment of toxic or hazardous materials). The container is structurally designed to maintain sealing integrity and a defined internal environment during under and overpressurization conditions. The internal bracing and support structure are removable and they can be modified or redesigned to accommodate an unlimited assortment of internal elements and applications. Passthroughs provide multiple service lines (electrical, fiber optic, liquids, etc.) into and away from the internal compartment.

DETAILED DESCRIPTION OF THE INVENTION

A seamless, light weight container, which in the preferred embodiment is made of metal, that provides two levels of liquid and gaseous containment is described. The container and its removable covers feature internal ribbing that provides structural rigidity for the container as well as strength and support when the device is exposed to either under pressurization or over pressurization states. To optimize heat transfer, the sample attachment points are positioned on the internal surface of the container in close proximity to the external thermoelectric devices. Internal bracing provides stable attachment points to the four side walls and the experiment package. The internal side wall structural supports can be removed and reconfigured to accommodate virtually any internal sample configuration, thereby providing great versatility.

The covers, passthroughs and vent plug all contain two seals. The wide lid flange and double seal design provide exceptional sealing capability when the container experiences pressure induced flexing. The large removable covers also provide easy access to the internal area of the container. One or more covers can be removed to accommodate sample loading. The covers are easily secured with standard fasteners to accommodate late access and early retrieval requirements. A vent plug is available to purge or precondition the internal space with a defined gaseous environment.

Confirmation of vessel seal integrity prior to shipment is accomplished by applying a vacuum or pressure to the internal space between the inner and outer seals. A test fixture is attached to a contiguous sidewall channel connecting the inner grove between the double seals of the covers, electrical passthroughs and vent plug. This close-out vacuum or pressure test can be completed within minutes and it provides certification that the container seals meet design criteria. More importantly, however, this procedure is noninvasive in that it does not harm or alter the preconditioned experimental environment within the container.

The container is also configured with two sealed electric passthrough assemblies that provide multiple electrical service lines into and away from the container. Numerous attachment points are provided for samples within the container. The nonferromagnetic materials that have been used to construct the container also provide electromagnetic interference shielding.

The unique combination of structural and design features, outlined above, provides the investigator or shipper with excellent containment and an acclimatized experimental environment in a single, user-friendly device.

Figure 1:
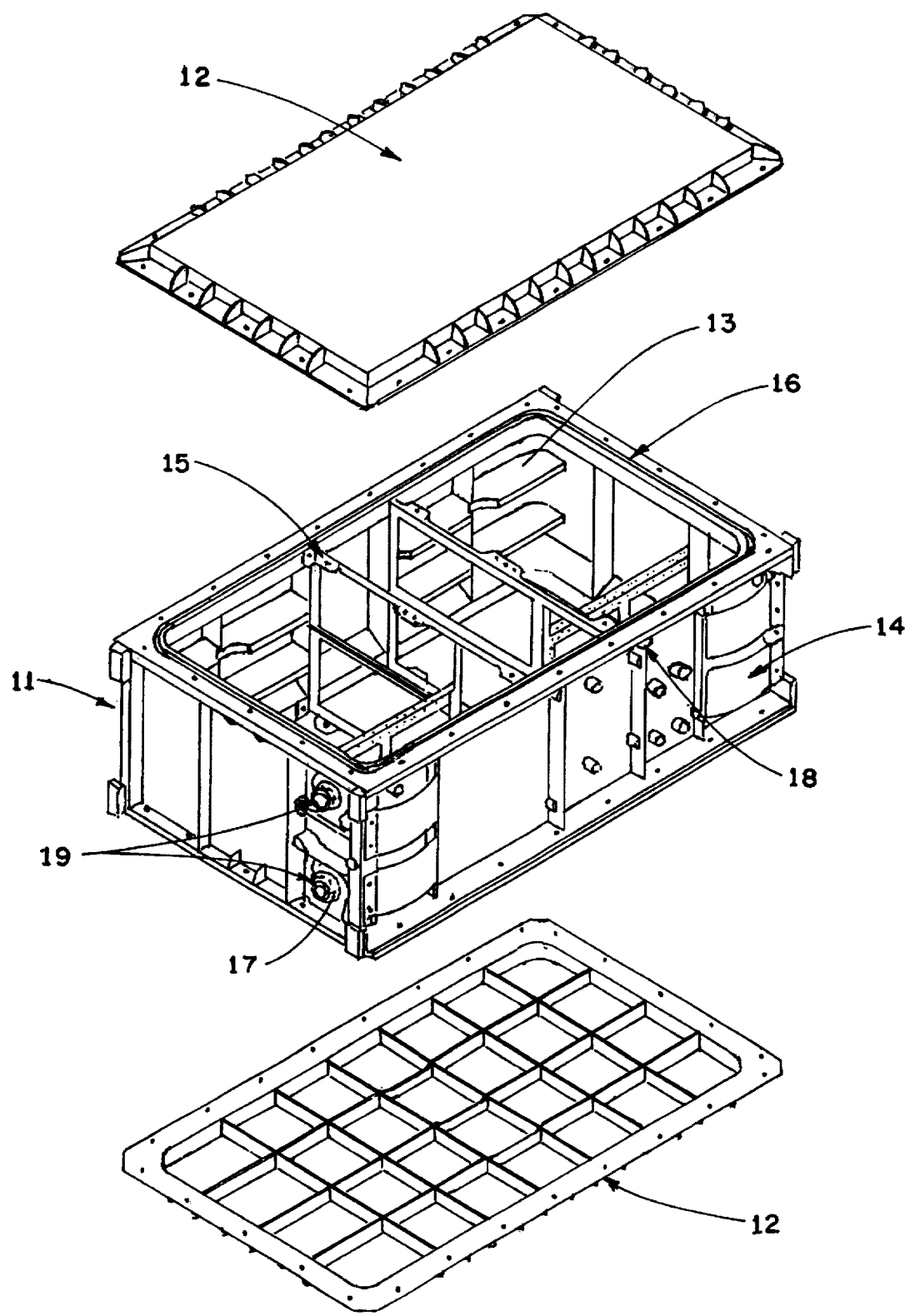
FIG. 1 is an isometric view of the container with its two covers removed. The cover seals, electrical passthroughs, vacuum test port, vent plug and removable internal support structure are identified.
Figure 2:
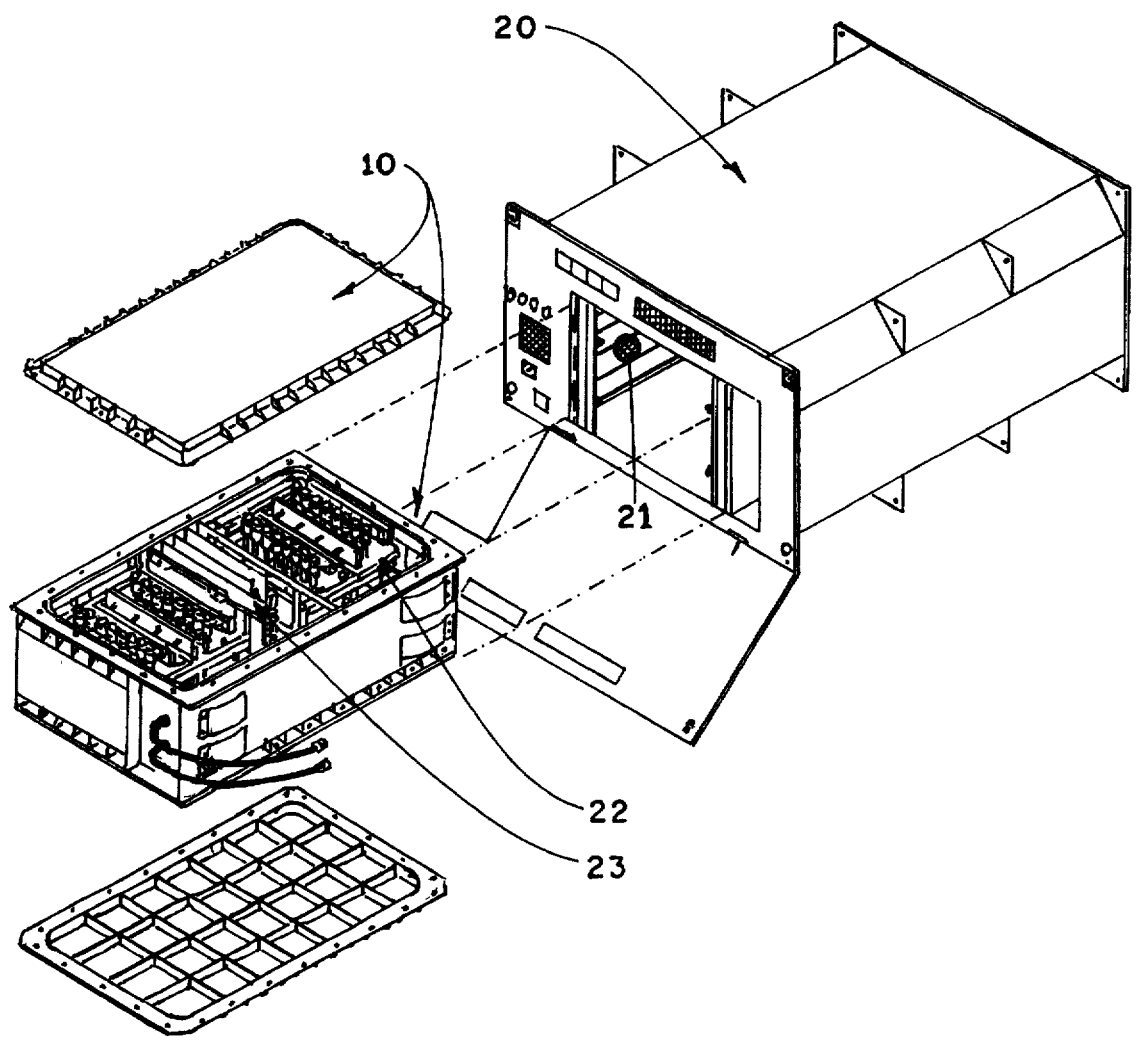
FIG. 2 is an overview of the container and its biological samples illustrating how the experimental package interfaces with a commercially available temperature control device.

Referring now to FIG. 1, the primary container housing 11 is fabricated from a solid metal block, but could be fabricated from other suitable materials. The primary experiment attachment points 13 are located on the internal surface of a container housing wall. The corresponding external surface of this housing wall is put in direct contact with the thermoelectric temperature control device 21 when the container 10 is inserted into the Refrigeration/Incubation Module temperature controller 20, as shown in FIG. 2. Hence, an efficient thermal transfer pathway is provided between the large contact surface on the thermal shoe of the temperature control device 21 and the internal structural elements within the container 10. This efficient thermal pathway results from the housing wall having the primary experiment attachment points 13 connected to its internal surface and the thermal shoe in contact with its external surface when the container 10 is inserted into the temperature controller 20. The upper and lower lid cover flanges are designed to mesh with the slotted sidewall channels of the carrier thereby immobilizing the container within the thermal device 20, FIG. 2. Four large springs 14 depicted in FIG. 1, are mounted on the opposite outer sidewall, where they provide lateral pressure and continuous thermal contact between the thermal device 20 and the container 10 shown in FIG. 2. The internal support structure 15 is bolted to the container housing 11 as illustrated in FIG. 1. It provides structural support for the container 10 and thermally insulated secondary attachment points for the biological samples 22 and onboard computer 23 shown in FIG. 2. The internal support structure 15 in FIG. 1 can be removed and reconfigured to readily accommodate changes in the experiment package or multiple internal experiment configurations.

In FIG. 1 the upper and lower covers 12 are secured to the container housing 11 with fasteners. The large flange that serves as the attachment point for the two covers contains redundant seals 16 shown in FIGS. 1, 3 and 4. The seals 16 are preferably O-rings. A vacuum test port plug 17 located on the right front container housing 11 is removed to access the vacuum test channel 24, shown in FIGS. 3 and 4, that is located between the two seals that circumscribe the upper and lower covers 12, the electrical passthroughs 19 and the vent plug 18. The removal of the vacuum test plug 17 and attachment of the close out leak test device 30 in FIG. 4 provides a rapid and reliable method for certifying that all of the container openings are properly sealed.

Figure 3:
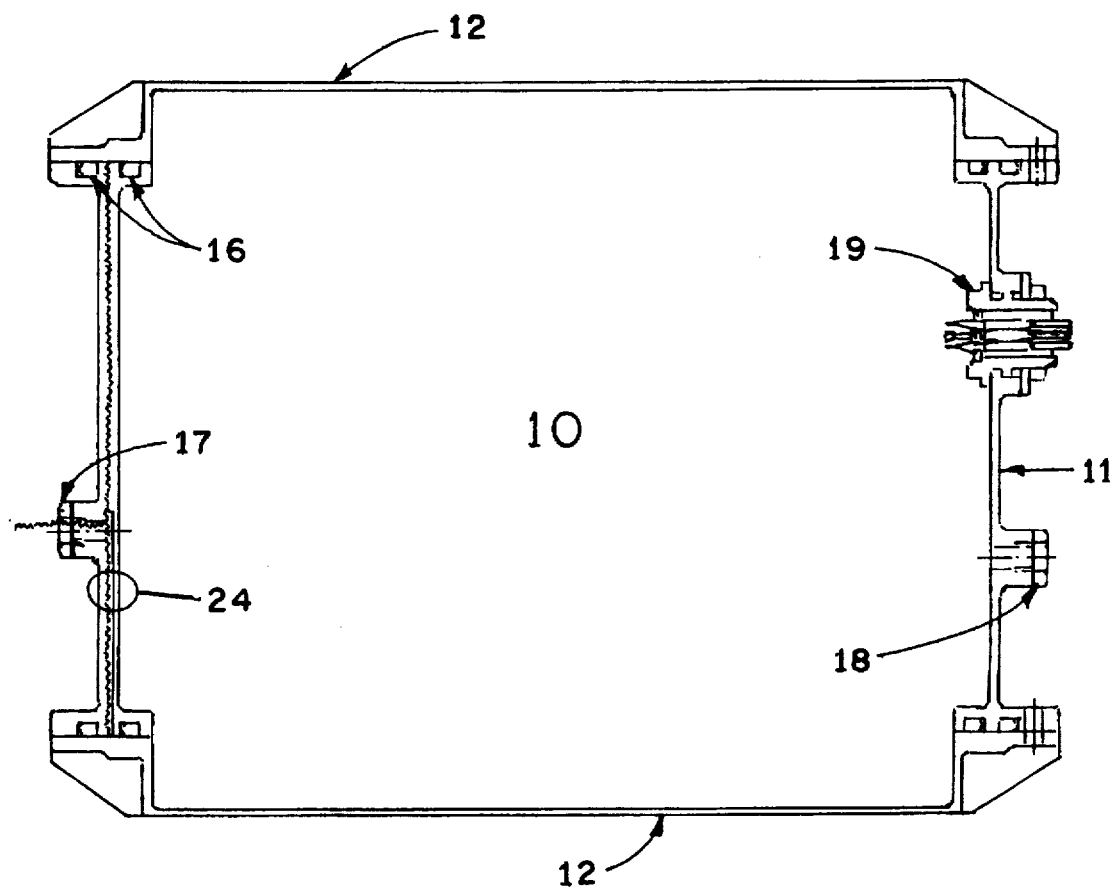
FIG. 3 illustrates the cover seals and the interconnecting channel that is used to accommodate the container close-out leak testing.
Figure 4:
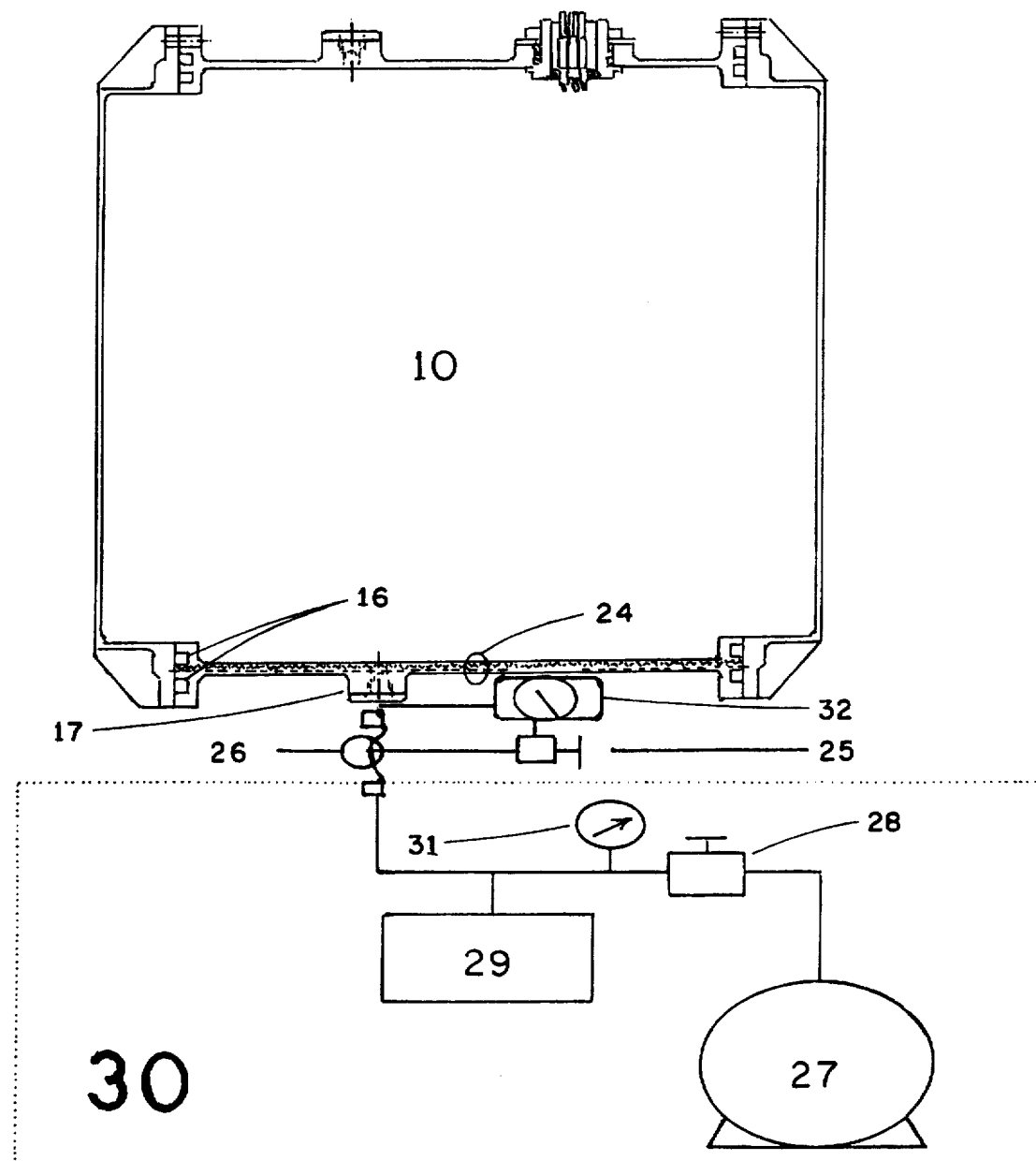
FIG. 4 provides a diagrammatic illustration of the test device and how it interfaces with the container during the close-out leak test.

The removal of the vent plug 18 in FIGS. 3 and 4 provides access to the gaseous environment within the experiment container. After the covers are secured the vent plug can be removed and the internal atmosphere of the container can be purged and preconditioned with virtually any combination of atmospheric gases. The plug's double seal design provides two levels of gas and liquid containment.

A double seal is also employed on each of the electrical passthroughs 19 as shown in FIGS. 1 and 3. Each passthrough can accommodate multiple electrical or fiber optic lines entering and exiting the container.

Once the biological samples are secured to the attachment points within the container and the covers are reinstalled, the payload is ready to undergo its final close-out leak test. This test procedure has been developed to certify that that container meets all STS hazardous materials containment requirements. More importantly, however, it provides the experimenter with the assurance that the user-defined, experimental environment can be maintained within the container throughout the mission.

The close-out test is initiated by the removal of the vacuum test plug 17 or opening the venting valve 25 located on the container housing 11 as illustrated in FIG. 4. This plug and or valve accesses the internal space 24 between the redundant seals 16 that circumscribe all of the container openings. The vacuum test line 26 is attached to the vacuum plug opening or the venting valve 25. After the vacuum pump assembly 30 is securely attached to the container 10, the vacuum pump 27 is turned on and the pressure within the defined space between the redundant seals is reduced to 5 Torr or less. While maintaining a strong vacuum, the throttle valve 28 on the test device is closed to isolate the container channel 24, accumulator 29 and vacuum gauge 31. When the throttle valve is closed, the vacuum pump 27 is turned off. The rate of leak, determined by the loss of vacuum from within this closed system, is monitored and evaluated.

After establishing that the container seals 16 meet or exceeds the design considerations established by the investigator, the test fixture 30 is removed and the vacuum plug 17 is replaced. If a vacuum monitoring device 32 is employed to continuously evaluate the integrity of the seals during the mission, it is isolated from vacuum test device 30 with a suitable valve 25 arrangement. The vacuum test apparatus 30 is then disconnected and the container 10 is inserted into the thermal device 20 and prepared for turnover. It is understood that the container leak rates that are achieved meet or exceed all relevant STS launch safety requirements.

It should be understood that the foregoing description is only illustrative of the invention. Various alternatives and modifications can be devised by those skilled in the art without departing from the invention. For example, although the container was initially designed to provide a controlled experimental environment for microgravity investigations, it would be equally useful for the shipment of infectious and or hazardous biological materials that may requiring precisely controlled experimental conditions as well as liquid or gas containment. This means that the applicability and usefulness of the device extends to both space and ground-based applications in which a controlled environment and secured containment are required for the shipment of materials. Accordingly, although the invention has been disclosed with reference to a preferred embodiment, it is to be understood that it is not limited to such embodiment and that various modifications of the invention are possible within the spirit and scope of the following claims.

What is claimed is:

1. A sealed container for transportation of labile biochemical and biological samples comprising:
   a. a container equipped with one or more removable covers that provide direct access to the internal area of the container and a means for fastening said covers;
   b. a means of sealing said container by using a set of double seals on all surfaces that provide seal integrity between the outside and interior of the container, wherein said sealing means has the ability to withstand pressure differentials between the internal and external surfaces of the container without loss of sealing integrity or alteration of the experimental environment within the container; and wherein said sealing means comprises said double seals circumscribing container openings, said double seals comprising two grooved channels containing two O-rings so as to form said double seals when said removable covers are fastened to the container:
   c. a means of precisely controlling the pressure, humidity, gas composition and internal temperature in said container by using an external, internal or some combination of thermal environment control; and
   d. a means to apply a vacuum or pressure to an internal space between said double seals over a user defined period of time thereby providing an assessment of the integrity of a seal contact surface without altering or affecting internal contents of the container.

2. A sealed container as claimed in claim 1, wherein there is an internal element means that is removable and modifiable so that internal structures are provided direct attachment points with more than one surface.

3. A sealed container as claimed in claim 2, wherein a passthrough means provides the opportunity to transmit materials, data and communications into and out of said sealed container while maintaining the sealed contact surface integrity of the container.

4. A sealed container as claimed in claim 3, wherein a removable sealing device means resembling a plug, provides an entrance pathway through which materials can be added to or removed from the container after the covers have been attached.

5. A sealed container as claimed in claim 1, wherein the sealed contact surface integrity of the container can be continuously monitored by the means where the space between said container seals can be either pressurized or depressurized and instrumented to continuously monitor any change in the status of the container seals.

6. A sealed container as claimed in claim 1, wherein
   a. two grooved channels circumscribe the openings in said container;
   b. two grooved channels circumscribe the edges of said removable covers on the side contacting said container; and
   c. the grooved channels on said container match the grooved channels on said removable covers so as to receive two O-rings to be used as said double seals circumscribing the container opening.

7. The container as claimed in claim 1 comprising:
   a. at least one electrical passthrough means;
   b. at least one vent plug; and
   c. at least one vacuum test plug;
   wherein one of said double seals is employed on said electrical passthrough means, said vent plug and said vacuum test plug.

8. The container as claimed in claim 7 wherein all of the double seals define a single continuous space between the double seals so that either a vacuum or a pressure can be applied to the single continuous space using the vacuum or pressure means connected to the vacuum test plug thereby testing the integrity of all the double seals simultaneously.

* * * * *